Jan. 9, 1945. J. KALIX 2,366,732
HYDROELECTRIC POWER UNIT
Filed July 30, 1943 2 Sheets-Sheet 1

Inventor
JOHN KALIX

Patented Jan. 9, 1945

2,366,732

UNITED STATES PATENT OFFICE 2,366,732

HYDROELECTRIC POWER UNIT

John Kalix, Dayton, Ohio

Application July 30, 1943, Serial No. 496,689

9 Claims. (Cl. 290—52)

(Granted under the act of March 3, 1883, as amended April 30, 1928; 370 O. G. 757)

The invention described herein may be manufactured and used by or for the Government for governmental purposes, without payment to me of any royalty thereon.

This invention relates generally to hydro-electric power generating apparatus but more particularly to an improved turbine generator set.

One object of the invention is to provide a turbine generator set in which the generator is operated at the best suited speed when the turbine is turning at its maximum R. P. M.

Another object of the invention is to provide a turbine generator set in which the rotor of the generator, and the runner of the turbine are suspended independently of each other and in which the rotating parts are held with more stability within the structure.

Another object of the invention is to provide a turbine generator set which is of simple and sturdy construction and one which may be easily assembled and dismantled.

Another object of the invention is to provide a turbine generator set in which a high speed generator is used thus making it possible to reduce the diameter of the rotor and the stator and thereby decrease the weight of the generator which results in an increase in the efficiency thereof.

Another object of the invention is to provide a turbine generator set which, due to its lightness in weight and simplicity in construction, costs less to produce, is more economical in operation, and more easily handled than those of lower speed generators.

Another object of the invention is to provide a type of turbine generator set which is adaptable for a shorter and narrower power house and one which requires less hoisting capacity of the gantry.

Another object of the invention is to provide a hydroelectric installation including units of gradually decreasing diameter to facilitate its removal from a dam well.

Other objects and advantages will become apparent from the specification, taken in connection with the accompanying drawings, wherein like parts are designated by similar reference characters.

Figure 1:
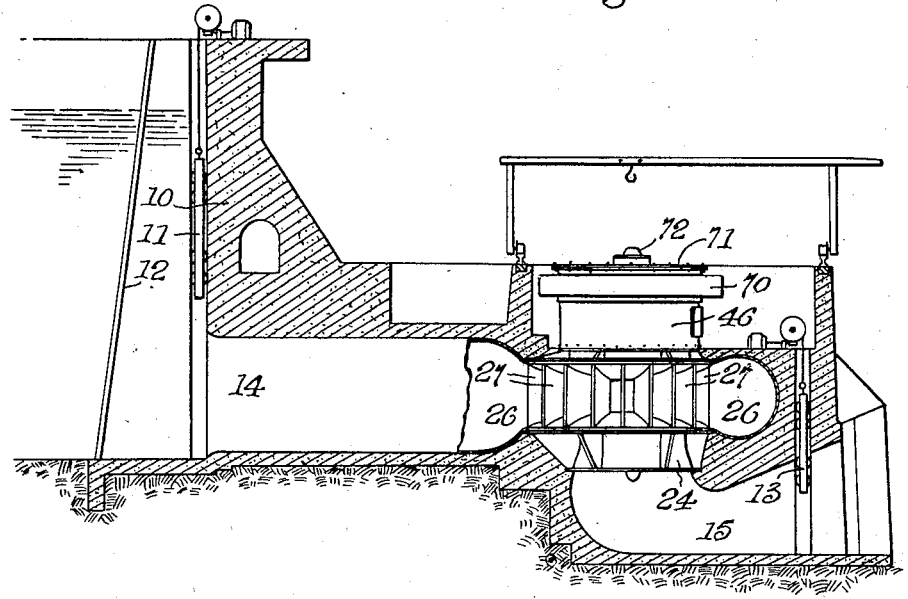
Fig. 1 is a sectionalized view of a dam taken on a central plane through the axis of a turbine generator set mounted therein.
Figure 3:
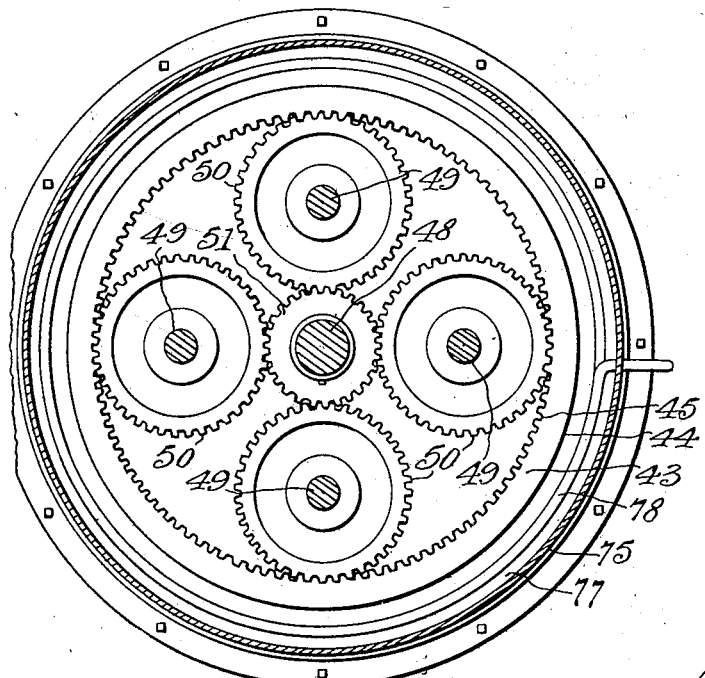
Fig. 3 is a sectionalized view taken on the line 3—3 of Fig. 1, showing assembled transmission gears.
Figure 4:
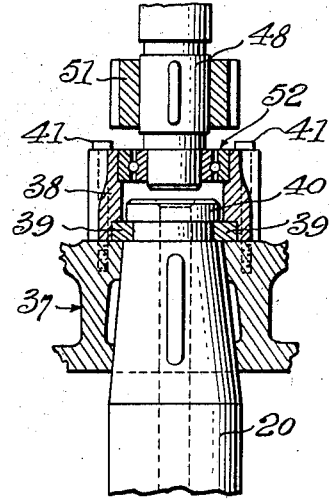
Fig. 4 is a fragmentary view showing, partially in section, the upper mounting of the runner shaft and the lower mounting of the generator shaft.
Figure 2:
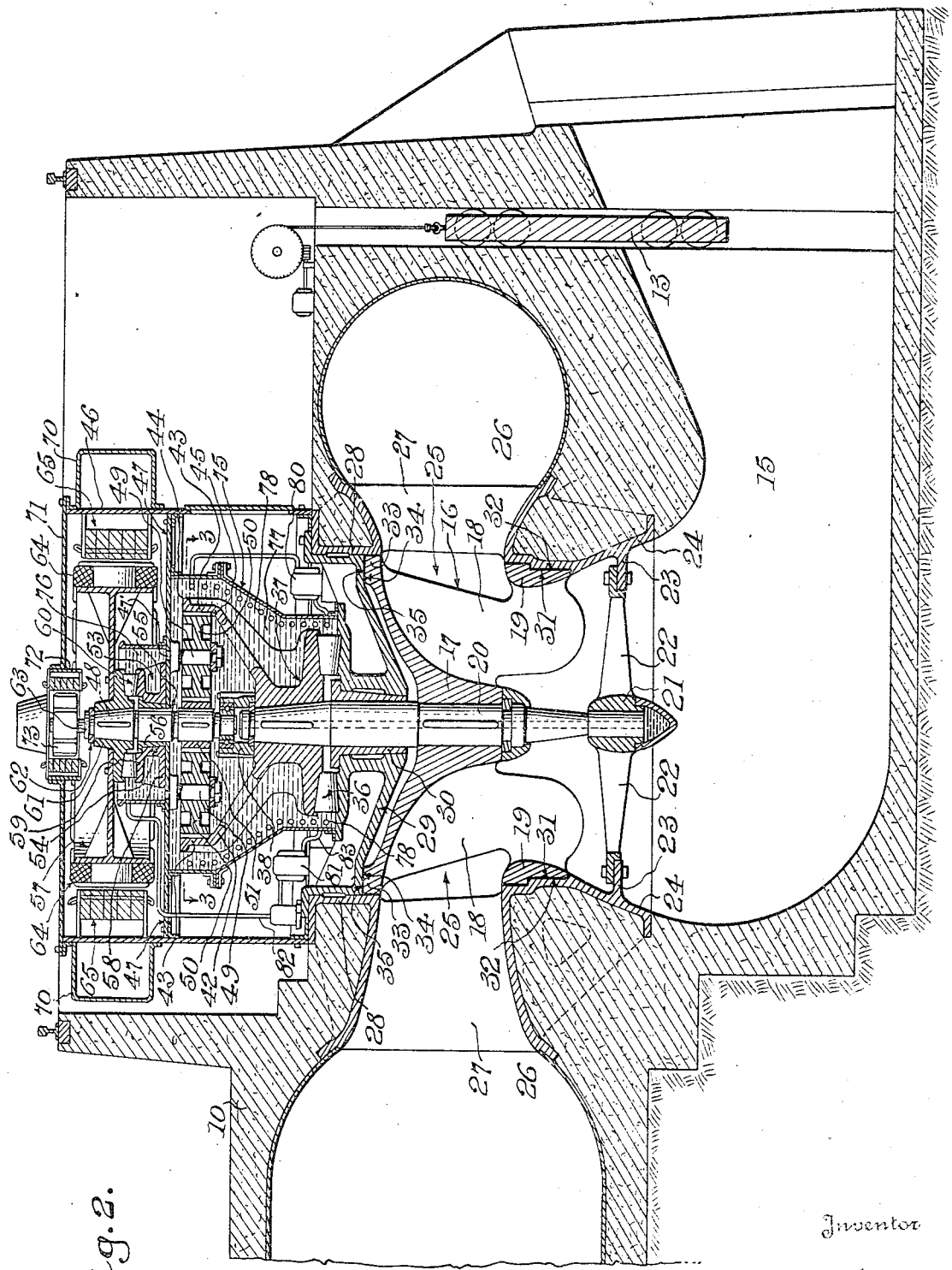
Fig. 2 is a sectionalized view of the motor generator set, taken on the same plane as shown in Fig. 1, showing details of construction and the mounting of the turbine and the generator.

Referring to Fig. 1, the numeral 10 designates a dam structunre having a head gate 11 in front of which is mounted a screen 12, and a tail gate 13. Between the head gate 11 and the tail gate 13 is mounted a turbine generator set which receives water through the tubular inlet 14 and expels it through the draft tube 15.

The turbine runner 16 comprises a hub 17 from which extend blades 18 having their outer ends joined to a discharge band 19. The hub is keyed to a central runner shaft 20 which extends downwardly beyond its lower extremity where it is mounted in an outboard bearing 21. This bearing is supported by a spider 22 mounted on brackets 23 extending radially from an annular supporting casing 24 forming the throat of the draft tube 15. The casing 24 is of annular construction forming a central runner chamber 25 surrounded by a tubular passage 26 of gradually decreasing diameter, and which is provided with a plurality of openings or passages formed by separator blades 27 so as to allow a flow of water to the runner blades 18 and thence to the draft tube 15.

The upper portion of the casing 24 is provided with a circular opening formed by a circular flanged wall 28. Into this opening is fitted a conical support member 29, provided with a centrally mounted turbine guide bearing 30 for supporting the runner shaft 20.

Between the bearing 30 of the conical support member and the outboard bearing 21 there is keyed to the shaft 20, the runner 16. The runner comprises a central conically shaped hub 17 from which extend the blades 18, the latter being attached to the discharge band 19 as mentioned above. The outer surface of the discharge band is formed with a stepped surface 31 around its periphery adapting it to fit a complementary stepped surface 32 formed on the casing 24, with only sufficient clearance between the adjacent surfaces to allow the free rotation of the blades 18. The conically shaped hub 17 of the runner 16 extends upward to a circular rim 33; the upper circular surface 34 of which is adjacent a lower peripheral surface 35 of the conical support member 29 with only sufficient clearance to permit the free rotation of the runner.

The conical support member 29, near the upper extremity of the guide bearing 30 is flanged, and the upper surface of the flange grooved to support a turbine thrust bearing 36. Upon the thrust bearing 36 is mounted a turbine shaft thrust block 37 which is keyed to the turbine shaft and retained thereto by a bearing cup 38 which is attached to the end of shaft 20 by means of key members 39. These key members 39 fit within the cup 38 and project beneath a head 40 on the shaft 20. The cup is retained to the thrust block 37 by means of the screws 41.

The upper portion of the thrust block 37 is formed as a conically shaped spider 42, the upper portion of which continues into a cylindrical rim 43 provided with a small flange 44. An internal gear 45 is cut into or attached to the interior surface of the cylindrical rim portion 43.

The thrust block and generator are contained within a circular casing 46 supported on the circular flange wall 28 of the casing 24. Within the casing 46 a circular partition 47 is supported adjacent the upper extremity of the thrust block 37 but with sufficient clearance to allow the free rotation of said thrust block beneath the partition.

The circular partition 47 is provided with a central circular opening for the passage of a generator shaft 48, and surrounding said opening and projecting from the partition, are located four idler gear shafts 49.

On the shafts 49 are mounted idler gears 50 which mesh with the internal gear 45 of the thrust block 37, and with a central gear 51 attached to the genertaor shaft 48 which projects through the central opening in the partition 47.

The generator shaft 48 is mounted in the outboard bearing 52 which is located within the bearing cup 38 attached to the thrust block 37.

A circular support member 53 which is mounted upon the partition 47 contains a central conical opening 54 which registers with a circular opening 55 in the partition 47. Within the conical opening 54 is fitted a bronze bushing 56 which functions as a guide bearing for the rotor shaft 48 of the generator 57.

The circular support member 53 is provided with a lower flange 58 which is attached to the partition 47 and an upper flange member 59, the upper surface of which is grooved to form a lower race for a generator thrust bearing 60. Upon the thrust bearing 60 is mounted a generator shaft thrust block 61 which is keyed to the generator shaft 48 and retained thereto by key members 62 which are fitted to the shaft intermediate a collar 63 and thrust block 61.

The thrust block 61 serves as a hub which supports the armature of the generator 57, the armature 64 thereof being rotated within the stator 65 by means of the turbine 16 through the intermediate transmission gears 45, 50 and 51 which produces a higher velocity for the armature shaft of the generator than that of the runner shaft of the turbine.

The circular casing 46 near its upper extremity and adjacent the stator mounting, is surrounded by an annular air duct 70, and the top of the casing is provided with a cover plate 71 having a central opening therein of sufficient diameter to fit the casing 72 of an exciter 73 which is connected to the upper extremity of the generator shaft.

The thrust block 37 of the runner shaft is surrounded by a circular casing 75 having a midsection of increasing circumference and which extends from the upper flange of support member 29 to the circular partition 47, and the thrust block 53 of the generator shaft is surrounded by a circular casing which extends from partition 47 to an upper edge which is adjacent the armature 64 of the generator. These casings form reservoirs 76 and 77 which are connected by small openings 47' in the partition 47, said reservoirs being utilized for the lubrication of bearings.

The lower reservoir is provided with cooling coils 78 through which a refrigerant is circulated by means of the compressor 80, and the lubricant which is contained within the reservoirs is circulated by a motor driven oil pump 81 connected to the reservoirs by an inlet tube 82 leading to the upper reservoir 76 and outlet tube 83 which is connected to the lower reservoir 77.

Having thus described my invention, what I claim as new and wish to secure by Letters Patent is:

1. A hydroelectric installation including a power well, a turbine unit and a generator unit mounted within said well and provided respectively with a runner and an armature having vertical shafts, means including bearings for separately mounting said shafts in axial alignment, and a transmission unit including a combined thrust block and ring gear attached to said runner shaft, idler gears, and a pinion attached to said armature shaft, a combined lubricant reservoir and housing enclosing said transmission, and a lubricating system connected with said reservoir adapted to lubricate said shaft bearings.

2. A hydroelectric installation comprising, in combination, an energy absorbing device, an energy translating device, said devices including swivelly connected, vertically disposed, axially aligned shafts, bearings for said shafts, and a driving connection between said shafts, said driving connection including a gear train, a combined lubricant reservoir and housing enclosing said driving connection and a lubricating system connected with said reservoir adapted to lubricate said shafts.

3. A hydroelectric installation comprising, in combination, an energy absorbing device, an energy translating device, said devices including swivelly connected, vertically disposed axially aligned runner and rotor shafts arranged in end-to-end relation, bearings for said shafts, a driving connection between said shafts, said driving connection including a gear train, a combined lubricant reservoir and housing enclosing said driving connection and a lubricating system connected with said reservoir adapted to lubricate said shaft bearings, and an exciter on the free end of said rotor shaft.

4. A hydroelectric installation comprising, in combination, an energy absorbing device, an energy translating device, said devices including swivelly connected, vertically disposed, axially aligned rotor and runner shafts arranged in end-to-end relation, bearings for said shafts, air cooling and gas dissipating means circumscribing said energy translating means, a driving connection between said shafts, said driving connection including a gear train, a combined lubricant reservoir and housing enclosing said driving connection and a lubricating system connected with said reservoir adapted to lubricate said shaft bearings, and an exciter apparatus mounted on the free end of said rotor shaft.

5. A hydroelectric installation comprising, in combination, an energy absorbing device, an energy translating device above said energy absorbing device, said devices including swivelly connected, vertically disposed rotor and runner shafts, bearings for said shafts, a rotary member keyed to said runner shaft and arranged between said devices, and a driving connection between said rotary member and said rotor shaft, said connection including a gear train, a combined lubricant reservoir and housing enclosing said gear train and a lubricating system connected with said reservoir adapted to lubricate said shaft bearings.

6. A hydroelectric installation comprising, in combination, an energy absorbing device, an energy translating device, said devices including swivelly connected, vertically disposed runner and rotor shafts, bearings for said shafts, a rotary member arranged between said devices and operable by said runner shaft, a driving connection between said rotary member and said rotor shaft, said driving connection including a gear train, a combined lubricant reservoir and housing enclosing said gear train and a lubricating system connected with said reservoir adapted to lubricate said shaft bearings, and air cooling and gas dissipating means circumscribing said energy translating device.

7. A hydroelectric installation comprising, in combination, a hydraulic turbine provided with a vertically disposed runner shaft and a runner fixed to said shaft, an electric generator disposed above said turbine and provided with a vertically disposed rotor shaft axially aligned with said runner shaft and arranged in end-to-end relation therewith, bearings for said shafts, means swivelly interconnecting the meeting ends of said shafts, and a driving connection between said shafts, said driving connection including a combined thrust block and ring gear, an idling gear, and a driving pinion keyed to said rotor shaft, a combined lubricant reservoir and housing enclosing said driving connection and a lubricating system connected with said reservoir adapted to lubricate said shafts.

8. A hydroelectric installation including a power well, a turbine unit and a generator unit mounted within said well, said turbine unit including a runner casing, a guide bearing, a thrust block bearing, and a turbine outboard bearing supported from the interior of said casing, a runner having a shaft mounted within said bearings and a generator outboard bearing mounted on the upper extremity of said shaft, said unit including a generator, an exciter, upper and lower support members, a thrust block bearing mounted on said lower support member and an upper generator outboard bearing supported by said upper support member, an armature having a shaft mounted within said bearings and supported by said lower generator outboard bearing, transmission means connecting said turbine shaft with said generator shaft, lubricating means associated with said turbine thrust block, and cooling means including cooling coils surrounding said turbine thrust block and said transmission means.

9. A hydroelectric installation including a power well, a turbine unit and a generator unit mounted within said well, said turbine unit including a runner affixed to a vertically mounted shaft, said shaft being provided with an outboard bearing at its upper extremity, said generator unit including a rotor attached to a vertically mounted shaft in axial alignment with said turbine shaft, said rotor shaft being supported in said outboard bearing at the upper extremity of said runner shaft, transmission means connecting said shafts, lubricating means including a reservoir in connection with said transmission means, and cooling means including coils surrounding said transmission means.

JOHN KALIX.